United States Patent [19]
Grimes

[11] Patent Number: 5,593,529
[45] Date of Patent: Jan. 14, 1997

[54] CYLINDRICAL FILTERS AND THEIR MANUFACTURE

[75] Inventor: Michael Grimes, Hayling Island, England

[73] Assignee: Pall Corporation, East Hills, N.Y.

[21] Appl. No.: 985,154

[22] Filed: Dec. 3, 1992

Related U.S. Application Data

[62] Division of Ser. No. 642,652, Jan. 17, 1991, Pat. No. 5,185,190.

[30] Foreign Application Priority Data

Jan. 18, 1990 [GB] United Kingdom .................. 9001141

[51] Int. Cl.⁶ .......................... B32B 31/04; B32B 31/20; B01D 29/07
[52] U.S. Cl. .......................... 156/218; 156/249; 156/290; 156/308.4; 156/309.6; 55/521; 210/493.1; 210/497.01; 428/34.6; 428/181
[58] Field of Search .................................. 156/247, 249, 156/256, 217, 218, 290, 308.4, 309.6, 210; 428/34.1, 34.7, 34.3, 34.6, 35.2, 57–59, 181, 183; 210/493.1, 493.2, 493.4, 497.01, 323.2; 55/520, 521, 500, DIG. 9, 498

[56] References Cited

U.S. PATENT DOCUMENTS

| | | | |
|---|---|---|---|
| 2,554,157 | 5/1951 | Snyder | 156/308.4 |
| 3,283,904 | 11/1966 | Buckman et al. | 210/497.01 |
| 3,306,794 | 2/1967 | Humbert, Jr. | 156/210 |
| 3,679,509 | 7/1972 | Fielibert | 156/309.6 |
| 3,865,919 | 2/1975 | Pall et al. | 264/259 |
| 4,089,783 | 5/1978 | Holyoak . | |
| 4,172,707 | 10/1979 | Robichaud et al. . | |
| 4,184,966 | 1/1980 | Pall et al. . | |
| 4,312,648 | 1/1982 | Day . | |
| 4,578,191 | 3/1986 | Jaffrin et al. . | |
| 4,609,465 | 9/1986 | Miller . | |
| 4,647,373 | 3/1987 | Tokar et al. | 210/493.4 |
| 4,747,946 | 5/1988 | Ikeyama et al. . | |
| 4,878,929 | 11/1989 | Tofsland et al. | 210/497.01 |
| 4,954,124 | 9/1990 | Erickson et al. | 156/308.4 |
| 4,963,258 | 10/1990 | Yagishita . | |
| 5,015,377 | 5/1991 | Silvera . | |

FOREIGN PATENT DOCUMENTS

| | | |
|---|---|---|
| 0001407 | 4/1979 | European Pat. Off. . |
| 0062867 | 10/1982 | European Pat. Off. . |
| 273014 | 3/1990 | Japan . |
| 1011342 | 11/1965 | United Kingdom . |
| 1031570 | 6/1966 | United Kingdom . |
| 2101902 | 1/1983 | United Kingdom . |

*Primary Examiner*—Michele K. Yoder
*Attorney, Agent, or Firm*—Leydig, Voit & Mayer

[57] ABSTRACT

A cylindrical filter is formed from a sheet of filter material which includes two connected layers of filter media. Opposed edges of the sheet are joined to form the cylinder by separating the media adjacent the edges and then sealing together the first of the separated layers followed by sealing the second of the separated layers. The two seals are spaced inwardly of the edges and are spaced from one another. In this way, failure of one seal does not result in failure of the cylindrical filter.

22 Claims, 4 Drawing Sheets

CYLINDRICAL FILTERS AND THEIR MANUFACTURE

This application is a divisional of application Ser. No. 07/642,652, filed Jan. 17, 1991, now U.S. Pat. No. 5,185,190.

BACKGROUND TO THE INVENTION

1. Field of the Invention

The invention relates to cylindrical filters and their manufacture.

A cylindrical filter is customarily formed from a sheet of filter media joined along two opposed edges to form the cylinder. The media may be in the form of a plain sheet or the sheet may be corrugated, in which case the joined edges are the final corrugations.

2. Brief Review of the Prior Art

The joint is customarily made by contacting the areas of the sheet adjacent The two edges and then forming a seal between these areas. In general, the overlap will be with the edges in register, particularly where the sheet is pleated. Such a sealed joint is acceptable where the sheet is formed from a single layer of filter media. It is, however, less satisfactory where the sheet is formed from two superimposed layers of media connected together. In this case, the possibility of a flow path through a single seal is increased.

In EP-A1-0001407 there is disclosed the joining of the edges of a sheet formed of two superimposed layers of media connected together and utilizing a channel strip for connecting the layers of media together. In U.S. Pat. No. 3,865,919 a number of corrugations of a pleated sheet of filter material are bonded together and then provided with a tape or ribbon of adhesive in a space formed between the corrugations. The adhesive is melted to form a leak-proof seal.

SUMMARY OF THE INVENTION

According to the first aspect of the invention, there is provided a method of forming a filter from a sheet of filter material including two layers of filter media by joining two opposed edges of the sheet to form a cylinder, the method comprising separating the filter media from said opposed edges to form two separate layers, contacting a first layer at one edge with a first layer at the other edge, sealing said contacting layers together with said seal extending along the length of said edges at a position spaced inwardly of said edges, positioning the second layer of said one edge and the second layer of said other edge so that said second layers at least partially overlie the sealed first layers, and then forming a seal between said second layers to each other, with said second seal extending along the length of said edges at a position inwardly of said edges and spaced from said first mentioned seal.

In this way, two separate seals are provided, which means that a failure of one seal need not result in a flow path between the edges.

According to a second aspect of the invention, there is provided a cylindrical filter formed from a sheet of filter material and including two connected layers of filter media, two opposed edges of the sheet being joined to form said cylinder, the layers being separated along said edges, a first layer of one edge being sealed to a first layer of the other edge along the length of the edges by a first seal spaced inwardly of said edges and a second layer of said one edge being sealed to a second layer of the other edge along the length of said edges by a second seal spaced inwardly of said edges and spaced from said first mentioned seal.

The following is a more detailed description of some embodiments of the invention, by way of example, reference being made to the accompanying drawings in which:

DESCRIPTION OF THE PREFERRED EMBODIMENTS

Figure 1:
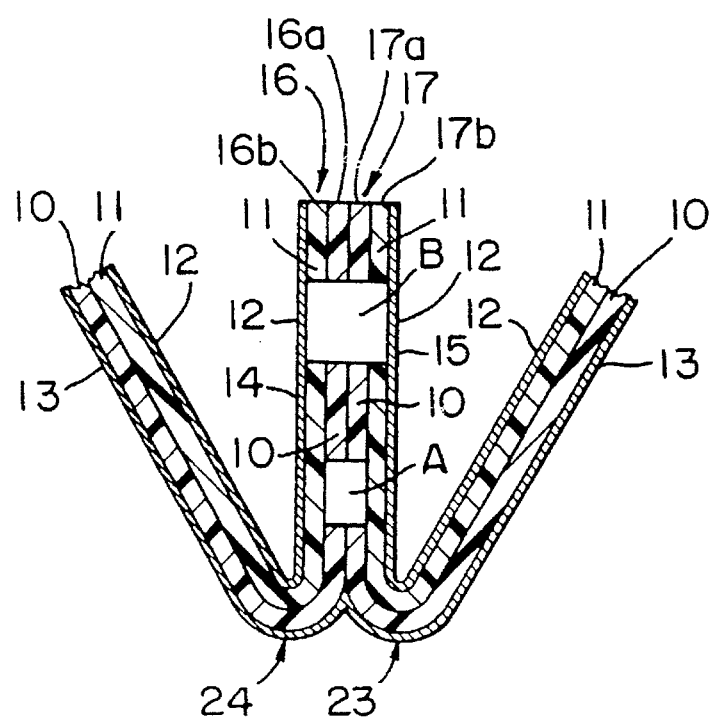
FIG. 1 is a cross-sectional view of part of a cylindrical pleated filter formed from a sheet of filter material including two connected layers of filter media and joined at the final corrugations.

Referring first to FIG. 1, the cylindrical filter is formed from a sheet of filter material having two layers of filter media 10, 11 which overlie one another add which are connected to one another. These layers 10, 11 are covered by upstream and downstream drainage material 12, 13. The layers of filter media are of nylon.

The sheet is corrugated to form two final corrugations 14, 15, which both extend in the same direction and terminate at respective edges 16, 17.

The sheet is formed into a cylinder in the following way.

First, the downstream drainage material 13 is removed from the first media layer 10 inwardly of the edges 16, 17 and along the length of the edges 16, 17. The first and second media layers 10, 11 and the upstream drainage material 12 are then separated at the edges 16, 17 for the complete height of the final corrugations 14, 15 and along the complete length of the final corrugations 14, 15 to form three separate layers, each of the filter media layers 10, 11 having its respective edges 16a, 17a, 16b, 17b.

Figure 2:
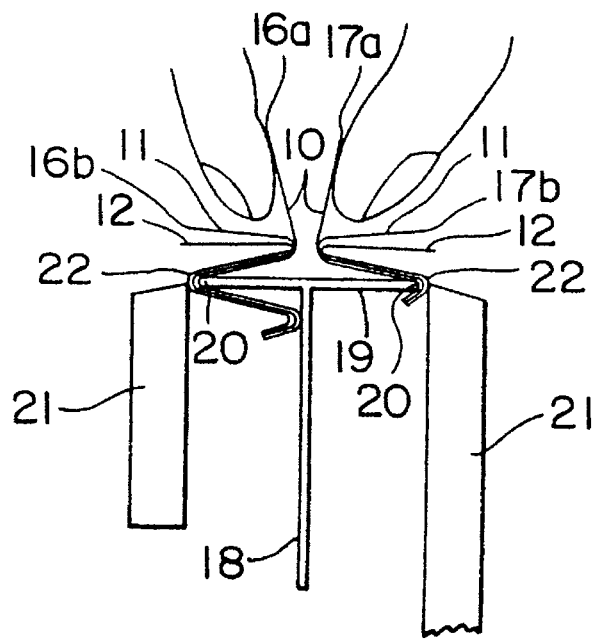
FIG. 2 is a diagrammatic view of a holder holding the ends of the pleated sheet shown in FIG. 1 before joining and showing a first stage in the joining process.

The corrugated sheet with the separated layers is then mounted in the holder shown in FIG. 2. This holder comprises a member 18 of T-shaped cross-section with the head 19 of the T movable so that the edges 20 of the head can engage with and disengage from respective supports 21. The width of the head is generally equal to twice the height of the corrugation of the completed sheet with which it is designed to be used.

The penultimate folds 22 of the sheet, prepared as described above, are arranged around the edges 20 of the head 19 of the member 18 and engaged with the supports 21. This ensures that the two edges 16, 17 are parallel.

Figure 3:
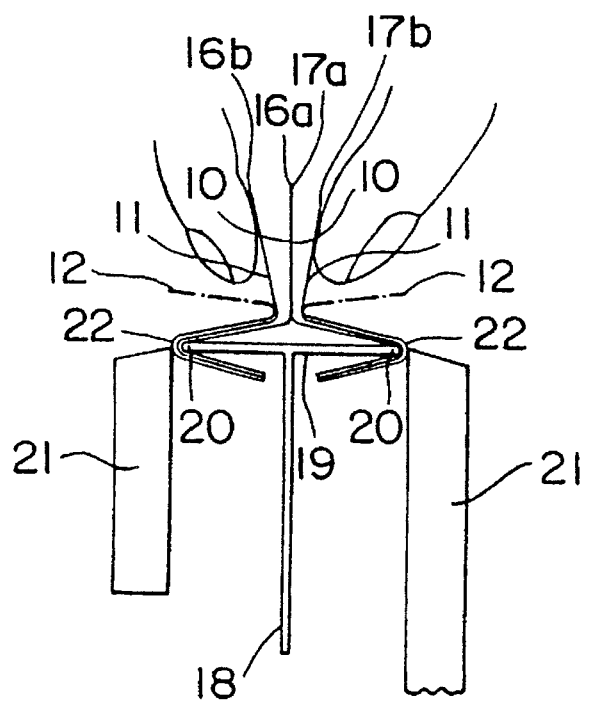
FIG. 3 is a similar view to FIG. 2, but showing a second stage in the joining process.

The two separated first layers 10 are then brought together by manual manipulation, as seen in FIG. 2. As shown in FIG. 3, the edges 16a, 17a of the first layer 10 are in register. These layers are then sealed together between heated jaws to form a seal extending parallel to the edges 16a, 17a and inwardly of the edges. The position and width of this seal are designated by the letter A in FIG. 1 and it will be seen that the seal is adjacent the final folds 23, 24 of the pleated sheet.

Referring next to FIG. 3, the second layers are then positioned manually to overlie the joined first layers 10 so that the edges 16b, 17b of the second layer 11 as well as the edges 16a, 17a of the first layer 10 are all in register, as shown in FIG. 1. The layers 10, 11 are then placed within jaws which form a second seal extending inwardly of the edges 16, 17 parallel to said edges and spaced from the first seal A. This seal connects together all of the layers. The width and position of this seal are indicated by the letter B in FIG. 1 and it will be seen that this seal is between the first seal A and the edges 16, 17.

Finally, the upstream drainage material 12 is re-assembled over the second layers 11.

There is thus formed a pleated cylindrical filter in which the final corrugations are joined inwardly of their edges by two parallel but spaced seals A, B. If the seal B should fail in its central portion, the seal A will still remain. If the seal B should fail towards its outer edges, leaking material will still have to pass through the filter media. In addition, longitudinal strength is increased and there is an increase of strength in a cartridge in which the corrugated filter is incorporated.

Six pleated cylindrical filters prepared as described above with reference to the drawings were tested in the following way.

All six cartridges were placed in an autoclave at 140° C. for four periods of one hour each. All six cartridges were tested for forward flow before the four one hour cycles and after the four one hour cycles. The filters were tested water wet at 2.61 kPa (18 psi).

An acceptable production limit for such forward flow is 10 ml/min and an acceptable limit in use is 22 ml/min.

The results were as follows:

| Filter No | FORWARD FLOW IN MLS/MIN | |
|---|---|---|
| | Before Steaming | After Steaming |
| 1 | 1.97 | 1.30 |
| 2 | 2.05 | 1.60 |
| 3 | 2.13 | 1.00 |
| 4 | 2.07 | 1.36 |
| 5 | 2.17 | 1.18 |
| 6 | 1.93 | 1.25 |

It will thus be seen that all filters remain well within the acceptable limits after autoclaving. This indicates that there has been no failure of the seals.

It will be appreciated that the method of manufacture and construction described above need not be applied to pleated filters, it could be applied to filters in which no pleats are provided. Further, the join may not be with the two edges in register, it could be with the two edges overlapping.

Figure 4:
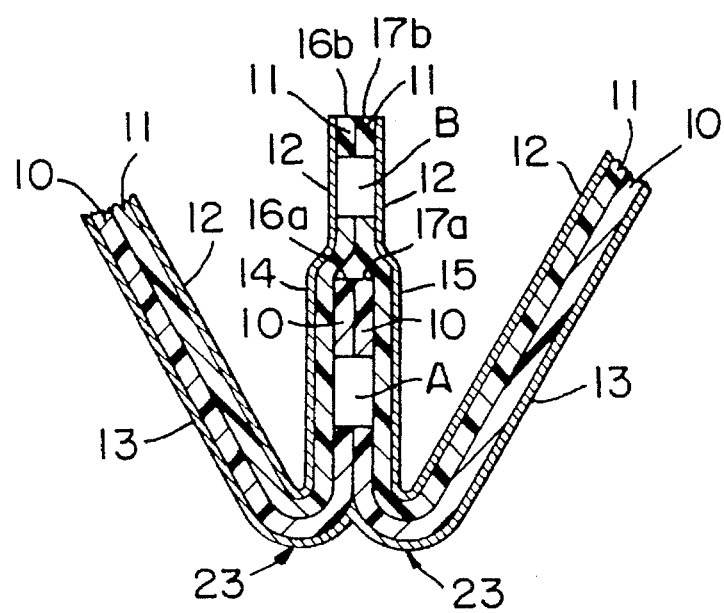
FIG. 4 is a similar view to FIG. 1, but showing a second form of join between the final corrugations.

A second form of join is shown in FIG. 4. Aspects of this join and the join described above with reference to FIGS. 1 to 3 are the same and these aspects will not be described in detail.

In this second form of join, the first seal A is formed as described above with reference to FIGS. 1 to 3. However, after formation of this seal A, the regions of the first media layer 10 between the seal A and the edges 16b, 17b of the second media layer 11 are cut-away. As shown in FIG. 4, the edges 16a, 17a of the first layer 10 are in register and are spaced from the edges 16b, 17b of the second layer 11, which are also in register.

Thus, when the second media layers 11 are positioned as shown in FIG. 3, these layers 11 only partially overlie the first media layers 10 and portions of the second media layers 11 are in contact. The second seal B is formed between these contacting second media layer portions 11, as shown in FIG. 4.

Figure 5:
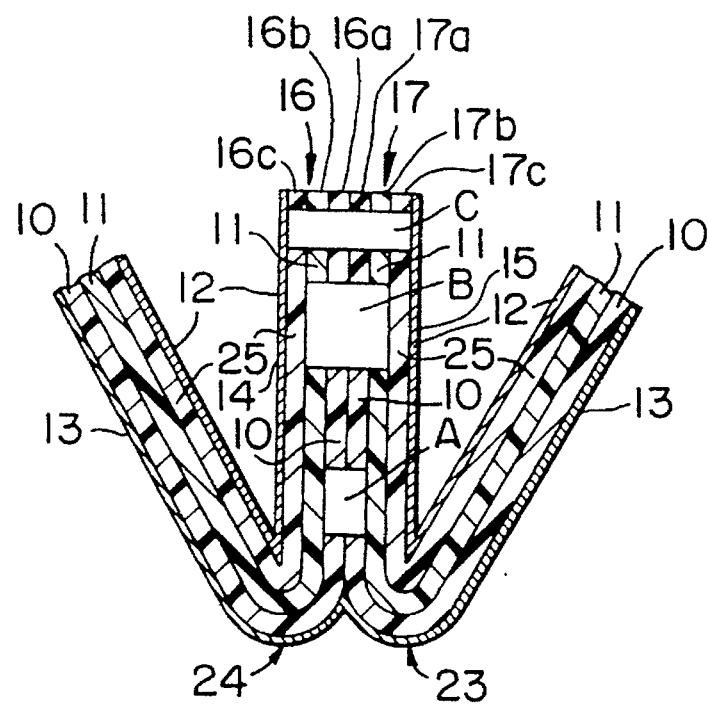
FIG. 5 is a similar view to FIG. 1 but showing a sheet of filter media formed from three connected layers of media and three seals, the seals connecting two, four and six layers of media respectively.
Figure 6:
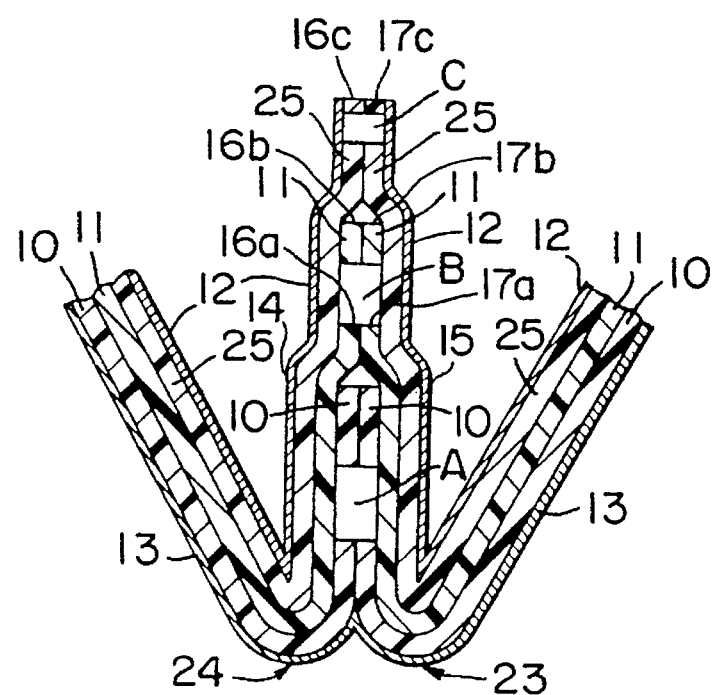
FIG. 6 is a similar view to FIG. 4 but showing a sheet of filter media formed from three connected layers of media and three seals, each seal connecting two of the layers.

The upstream drainage material 12 is then re-assembled. It will be appreciated that filters having three or more media layers may be joined by either of the methods described above with reference to the drawings. In such cases, the media layers may all be separated and joined successively in pairs by spaced seals, so that there are as many seals as layers. This is shown in FIGS. 5 and 6 where parts common to FIGS. 1 and 4 and to FIGS. 5 and 6 will be given the same reference numerals and will not be described in detail. In these embodiments, the cylindrical filter is formed from a sheet of filter material having three layers of filter media 10, 11, 25 which overlie one another and are connected to one another. The layers of filter media 10, 11, 25 are of nylon.

The sheet is corrugated to form two final corrugations 14, 15, which both extend in the same direction and terminate at respective edges 16, 17.

The sheet of FIG. 5 is formed into a cylinder in the way described above with reference to FIG. 1 except that the third media layer 25 is also separated at the edges 16, 17 for the complete height of the final corrugations 14, 15 and along the complete length of the final corrugations 14, 15 to form six separate layers.

The layers 10, 11 are joined as described above with reference to the drawings. The portions of the separated third layer 25 are then brought together by manual manipulation. As shown in FIG. 5, both edges 16a, 17a, 16b, 17b, 16c, 17c of all of the filter media layers 10, 11, 25 are in register. The layers are then sealed together between heated jaws to form a seal extending parallel to the edges 16, 17 and inwardly of the edges. The position and width of this seal are designated by the letter C in FIG. 5 and it will be seen that the seal is adjacent the final folds, and closer to the edges 16, 17 than the previously formed seals A, B.

Finally, the upstream drainage material 12 is re-assembled over the second layers 11.

There is thus formed a pleated cylindrical filter in which the final corrugations are joined inwardly of their edges by three parallel but spaced seals A, B, C. If the seal C should fail in its central portion, the seals A and B will still remain. If the seal C should fail towards its outer edges, leaking material will still have to pass through the filter media. In addition, longitudinal strength is increased and there is an increase of strength in a cartridge in which the corrugated filter is incorporated.

The second form of join is shown in FIG. 6. Aspects of this join and the join described above with reference to FIGS. 1 to 5 are the same and these aspects will not be described in detail.

In this second form of join, the first seal A and the second seal B are formed as described above with reference to FIG.

4. However, after formation of the second seal B, the portions of the second media layer 11 between the seal B and the edges 16c, 17c of the third media layer 25 are cut-away. As shown in FIG. 6, the edges 16b, 17b of the second layer 11 are in register and are spaced from the edges 16c, 17c of the third layer 25, which are also in register.

Thus, when the portion of the third media layer 25 are positioned as shown in FIG. 6, these portions only partially overlie the first and second media layers 10, 11 and are in contact. The third seal C is formed between these contacting third media layer portions 25, as shown in FIG. 6.

Alternatively, two layers (or more where there are four or more layers) near each edge may be joined together so that there are less seals than layers. This is shown in FIGS. 7 and 8 where parts common to FIGS. 1 to 6 and to FIGS. 7 and 8 will be given the same reference numerals and will not be described in detail.

Figure 7:
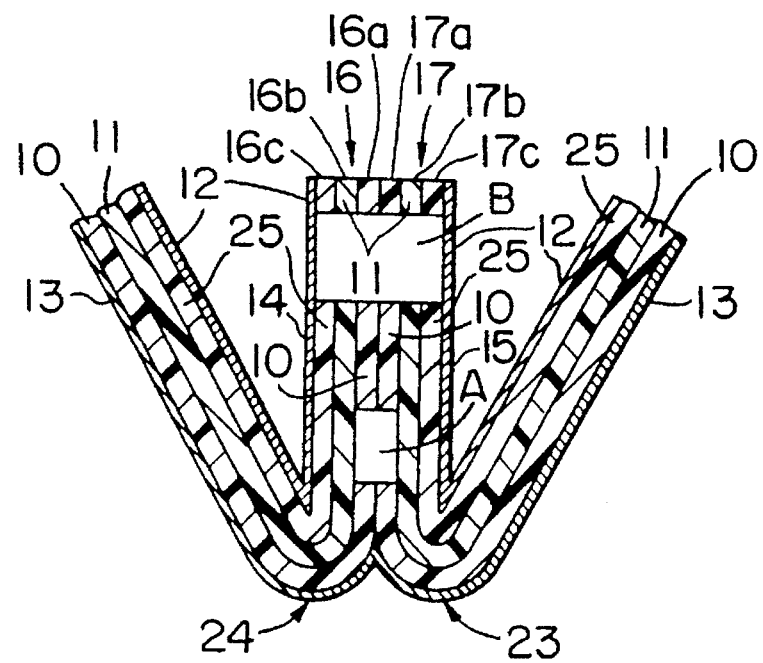
FIG. 7 is a similar view to FIG. 5 but showing only two seals, one seal connecting two layers and the other seal connecting all six layers.

In FIG. 7, the third media layer 25 is not separated from the second media layer 11 and the portions near the edges 16b, 17b, 16c, 17c 16, 17 of these two layers 11, 25 are sealed together as one, as described above with reference to FIGS. 2 and 3. There are thus only two seals A, B, with the same seal A connecting two portions of the first media layer 10, and the other seal B connecting all six portions of all of the media layers 10, 11, 25.

Figure 8:
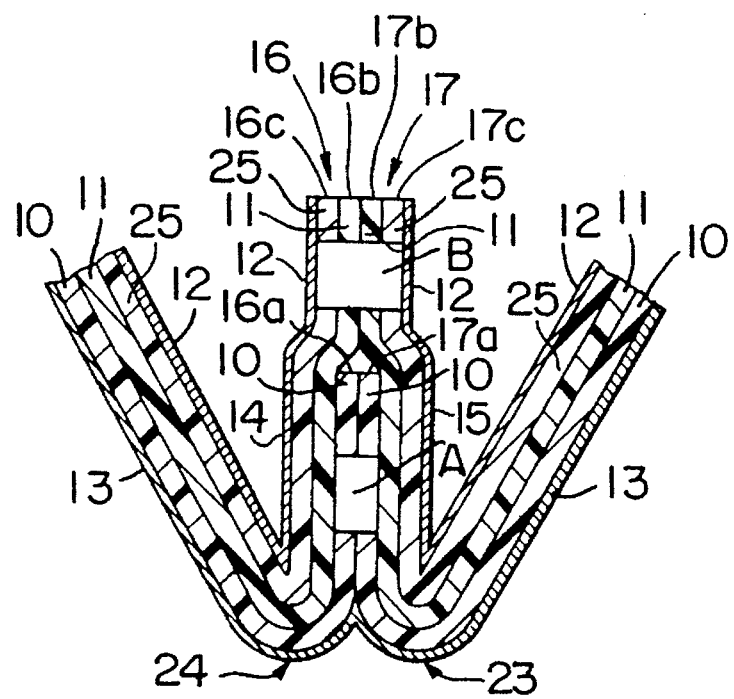
FIG. 8 is a similar view to FIG. 6 but showing only two seals, one seal connecting two layers and the other seal connecting the remaining four layers.

In FIG. 8, the third media layer 25 is not separated from the second media layer 11 and the portions near the edges 16b, 17b, 16c, 17c of these two layers are sealed together as one, as described above with reference to FIG. 4. There are only two seals A, B with the inner seal connecting the two portions of the first media layer 10, and the outer seal connecting the four portions of the remaining media layers 11, 25.

What is claimed is:

1. A method of forming a filter from a sheet of filter material including at least first and second layers of filter media, each layer having first and second edges, comprising the steps of:

(a) contacting a portion of the first layer of filter media near the first edge with a portion of the first layer near the second edge;

(b) sealing the contacting portions together with a first seal with the first seal extending along the length of the edges at a first position spaced from the edges, without a seal at the edges;

(c) positioning a portion of the second layer of filter media near the first edge of the first layer and a portion of the second layer near the second edge of the first layer so that the second layer portions at least partially overlie the sealed first layer portions; and then (d) forming a second seal between the second layer portions, with the second seal extending along the length of the edges at a second position spaced from the edges, without a seal at the edges, and spaced from the first seal.

2. The method according to claim 1 wherein contacting portion of the first layer includes placing the respective edges thereof in register, wherein the first layer is sealed together and then the second layer is sealed with the second seal.

3. The method according to claim 2 wherein positioning the second layer portions includes contacting the portions of the second layer and wherein forming a seal between the second layer portions includes forming a seal between the contacting second layer portions.

4. The method according to claim 2 wherein when the second layer is positioned to at least partially overlie the first layer, the edges of the first and second layers are in register, so that the second seal seals together the first and second layers.

5. The method according to claim 3 wherein the sheet is corrugated with the seals being formed between final corrugations of the sheet, the first seal being between downstream filter media and the second seal being between upstream filter media.

6. The method according to claim 1 wherein the sheet is provided with a surface drainage material on both surfaces thereof, the method including removing the drainage materials from the edges before sealing.

7. The method according to claim 1 wherein the sheet of filter material has at least three layers of filter media, at least one of the layers additional to the first and second layers being maintained connected to the first or second layer during the method.

8. The method according to claim 1 wherein the sheet of filter material further includes a third layer having first and second edges and where the method further comprises positioning a portion of the third layer near the first edge and a portion of the third layer near the second edge so that the third layer portions at least partially overlie the sealed first and second layer portions; and forming a seal between the third layer portions, with the third seal extending along the length of the edges at a position spaced from the edges and spaced from the first and second seals.

9. The method according to claim 3 further comprising removing part of the first layer portions beyond the first seal after the first layer portions are sealed together.

10. A method according to claim 1 wherein sealing the first layer portions further comprises sealing the first layer portions with the first and second edges of the first layer extending in the same direction from the first seal.

11. A method according to claim 10 wherein sealing the second layer portions further comprises sealing the second layer portions with the first and second edges of the second layer extending in the same direction from the second seal.

12. A method according to claim 1 wherein sealing the second layer portions further comprises sealing the second layer portions with the first and second edges of the second layer extending in the same direction from the second seal.

13. A method according to claim 8 wherein sealing the first layer portions further comprises sealing the first layer portions with the first and second edges of the first layer extending in the same direction from the first seal.

14. A method according to claim 8 wherein sealing the second layer portions further comprises sealing the second layer portions with the first and second edges of the second layer extending in the same direction from the second seal.

15. A method according to claim 14 wherein sealing the third layer portions further comprises sealing the third layer portions with the first and second edges of the third layer extending in the same direction from the third seal.

16. A method according to claim 13 wherein sealing the third layer portions further comprises sealing the third layer portions with the first and second edges of the third layer extending in the same direction from the third seal.

17. A method according to claim 8 wherein sealing the third layer portions further comprises sealing the third layer portions with the first and second edges of the third layer extending in the same direction from the third seal.

18. A method of forming a filter from at least first and second adjacent layers of filter media, each adjacent layer having first and second edges, comprising the steps of:

(a) sealing a first portion of a first layer of filter media with a second portion of the first layer using a first seal extending only along the length of the first and second edges of the first layer at a first position, wherein the first and second edges of the first layer extend in the same direction from the first seal;

(b) sealing a first portion of the second layer of filter media with a second portion of the second layer of filter media using a second seal extending only along the length of the first and second edges of the second layer of filter media at a second position spaced from the first seal, wherein the first and second edges of the second layer extend in the same direction from the second seal.

19. The method according to claim 18 wherein sealing includes sealing the first layer with the first and second edges of the first layer in register and sealing the second layer with the first and second edges of the second layer in register.

20. The method according to claim 19 wherein sealing includes sealing the first and second layers with the first and second edges of the first layer spaced from the first and second edges of the second layer.

21. A method of forming a filter from at least first and second adjacent layers of filter media, each adjacent layer having first and second edges, comprising the steps of:

(a) sealing a first portion of the first layer of filter media near the first edge with a second portion of the first layer near the second edge using a first seal extending only along the length of the first and second edges of the first layer at a first position spaced from the first and second edges of the first layer, wherein the first and second edges of the first layer are in register and extend in the same direction from the first seal;

(b) sealing a first portion of the second layer of filter media near the first edge with a second portion of the second layer near the second edge using a second seal extending only along the length of the first and second edges of the second layer at a second position spaced from the first seal and from the first and second edges of the second layer, wherein the first and second seals are adjacent to each other, the first and second edges of the second layer are in register, and wherein the first and second edges of the second layer extend in the same direction from the second seal.

22. A method according to claim 21 wherein sealing includes sealing the first and second layers of filter media with the first and second edges of the first layer spaced from the first and second edges of the second layer.

* * * * *